(No Model.)
F. R. GOSNELL.
SUCKER ROD ELEVATOR.
No. 590,542. Patented Sept. 21, 1897.
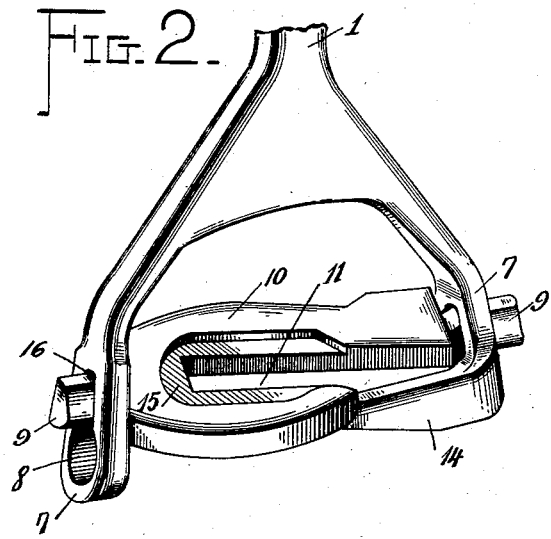
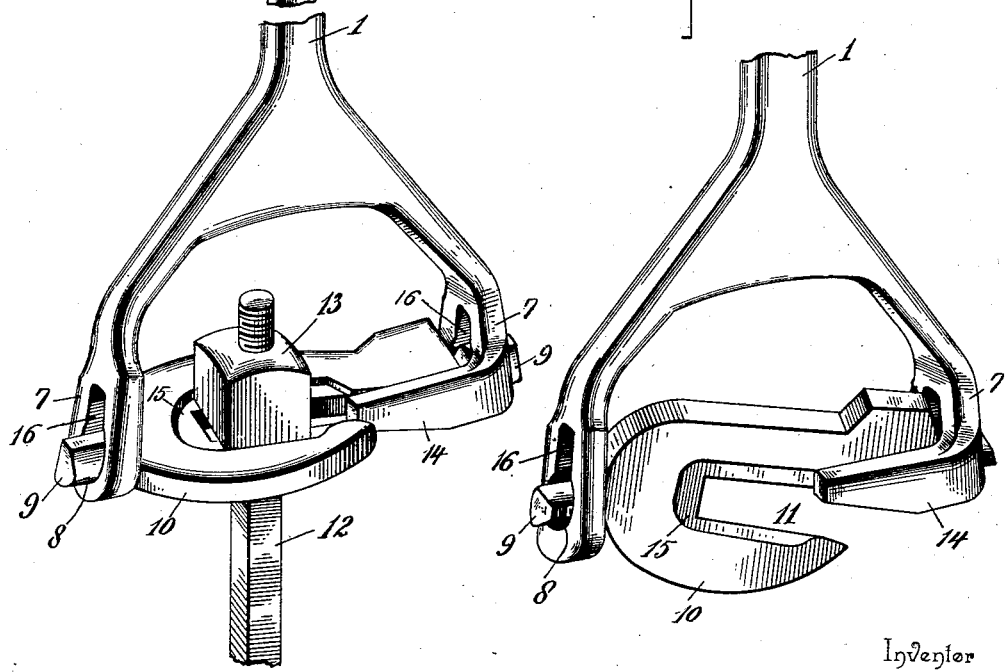
Witnesses
Inventor
Frank R. Gosnell.
By his Attorneys,
C. A. Snow & Co.

UNITED STATES PATENT OFFICE.

FRANK R. GOSNELL, OF FOSTORIA, OHIO, ASSIGNOR OF ONE-HALF TO JOHN M. WASSON AND FRANK ROSS, OF SAME PLACE.

SUCKER-ROD ELEVATOR.

SPECIFICATION forming part of Letters Patent No. 590,542, dated September 21, 1897.

Application filed April 15, 1897. Serial No. 632,297. (No model.)

*To all whom it may concern:*

Be it known that I, FRANK R. GOSNELL, a citizen of the United States, residing at Fostoria, in the county of Seneca and State of Ohio, have invented a new and useful Sucker-Rod Elevator, of which the following is a specification.

This invention relates to sucker-rod-elevating devices, and has for its object to provide an apparatus so constructed that when the elevating-rope becomes slack the stem of the elevator is not allowed to drop to a horizontal position, but is held in an approximately vertical position, the disadvantage connected with allowing such a swinging movement being that it is liable to cause injury to the surrounding mechanism and also to any workmen occupied near the well.

A further object of the invention is to provide means for preventing the accidental disengagement of the hook on the end of an elevating rope or cable from the swivel on the upper extremity of the stem of the elevator.

Further objects and advantages of the invention will appear in the following description, and the novel features thereof will be particularly pointed out in the appended claims.

In the drawings, Figure 1 is a perspective view of a sucker-rod-elevating device constructed in accordance with this invention. Fig. 2 is a similar view of the lower portion of the apparatus, including the wrench-head, showing the body portion of the device in its depressed position, as when an elevating rope or cable is slack. Fig. 3 is a similar view of a portion of the apparatus, showing the stem turned in an approximately horizontal position, as when engaging the wrench-head with the shank of a sucker-rod.

Similar numerals of reference designate corresponding parts in the various figures of the drawings.

1 designates the stem of the improved elevator, to the upper end of which is connected a swiveled eye 2, adapted to be engaged by the hook of an elevating rope or cable, such as that shown at 3 in Fig. 1.

In the construction illustrated the hook 4 of said cable is connected therewith by means of a swivel-eye 5 and is provided with a downwardly-extending lug or projection 6, which serves to prevent the accidental disengagement of the hook from the swivel-eye 2 when for any reason the elevating rope or cable becomes slack and thereby allows said hook to drop from its normal elevating position.

The lower end of the stem is forked, and in the extremities of the prongs 7 thereof are formed alined bearings 8 for the reception of the trunnions 9 on opposite extremities of the wrench-head 10. This wrench-head is provided with an angular mouth or opening 11 to receive the angular portion of a sucker-rod shank 12, (shown in Fig. 1,) said shank being fitted at its upper end with the usual head or collar 13 to bear upon the upper surface of the wrench-head.

Rigidly fixed to or formed integral with one of the prongs of the apparatus is a clamping lug or projection 14, which is adapted to extend into said mouth or opening of the wrench-head to prevent the accidental disengagement of said wrench-head from the sucker-rod shank; but in addition to this ordinary means for preventing displacement I preferably form a depressed or countersunk seat 15 around the opening or mouth in the upper surface of the wrench-head to receive the under side of said sucker-rod head or collar, whereby, even in case of the lug or projection becoming detached or inoperative, the head or collar of the sucker-rod will remain properly seated on the wrench-head.

In practice it is quite common for the elevating rope or cable to become loose at different times during the operation of raising a sucker-rod, and under these circumstances there is nothing in connection with the ordinary form of elevating device to prevent the main or body portion thereof, including the stem, prongs, and attachments, from swinging to or toward a horizontal position, and thus doing injury both to the operator and to parts of the mechanism. In order to prevent such swinging movement of the upper portion of the elevating device, I construct the trunnions of the wrench-head of irregular form, as vertically elongated in cross-section, and provide the bearings in the lower ends of the prongs with upward elongations or extensions 16, adapted to receive and snugly fit said trunnions. Ordinarily the trunnions of the wrench-head are located in the lower circular portions of the bearings, thereby leaving the body portion of the device free to swing upon the trunnions, as in the ordinary practice; but when the stem is in an upright position and the elevating means become slack said body portion or stem of the device descends vertically a distance sufficient to cause engagement of the upward extensions of the bearings with the trunnions, and thereby securely locks the stem against downward swinging movement. It is necessary to elevate the stem in order to disengage it preparatory to swinging the same upon the trunnions as a center.

Changes in the form, proportion, and the minor details of construction may be resorted to without departing from the principle or sacrificing any of the advantages of this invention.

Having thus described the invention, what is claimed, and desired to be secured by Letters Patent, is—

1. A sucker-rod elevator having a forked stem, and a wrench-head provided with cross-sectionally flattened trunnions fitted in bearings in the prongs of the stem said bearings having upward extensions to snugly receive the trunnions and lock the stem against swinging movement, substantially as specified.

2. A sucker-rod elevator having a forked stem, provided in the extremities of its prongs with alined bearings having upward angular extensions, and a wrench-head having trunnions fitted in said bearings and elongated vertically in section to fit in said extensions when the stem is depressed, to lock the latter against swinging movement, substantially as specified.

3. A sucker-rod elevator having a wrench-head, a swinging stem loosely mounted upon the wrench-head and having a limited independent linear movement, and locking devices, for holding the stem in an upright position, the same having interlocking members carried respectively by the stem and wrench-head for engagement and disengagement, respectively, by linear movements of the stem in opposite directions, substantially as specified.

In testimony that I claim the foregoing as my own I have hereto affixed my signature in the presence of two witnesses.

FRANK R. GOSNELL.

Witnesses:
OLIVER BYERS,
BIRT JOHNSON.